(12) United States Patent
Watt et al.

(10) Patent No.: US 9,517,899 B2
(45) Date of Patent: Dec. 13, 2016

(54) SYSTEM FOR UNLOADING ITEMS

(71) Applicant: Amazon Technologies, Inc., Reno, NV (US)

(72) Inventors: William James Watt, Wakefield, MA (US); Timothy Aaron Bragg, Woburn, MA (US); Andrew Stubbs, Somerville, MA (US); Matthew David Verminski, North Andover, MA (US); John P. Dugan, Wilmington, MA (US)

(73) Assignee: Amazon Technologies, Inc., Reno, NV (US)

( * ) Notice: Subject to any disclaimer, the term of this patent is extended or adjusted under 35 U.S.C. 154(b) by 441 days.

(21) Appl. No.: 13/895,810

(22) Filed: May 16, 2013

(65) Prior Publication Data

US 2013/0251480 A1    Sep. 26, 2013

Related U.S. Application Data (63) Continuation of application No. 12/609,690, filed on Oct. 30, 2009, now Pat. No. 8,444,369.

(51) Int. Cl.
*B65G 49/00* (2006.01)
*B65G 67/26* (2006.01)
*B65G 37/02* (2006.01)

(52) U.S. Cl.
CPC .............. *B65G 49/00* (2013.01); *B65G 37/02* (2013.01); *B65G 67/26* (2013.01)

(58) Field of Classification Search
CPC .............................. B65G 47/883; B65G 67/26
USPC ... 198/599, 635, 637; 414/331.13, 337, 389, 414/402
See application file for complete search history.

(56) References Cited

U.S. PATENT DOCUMENTS

| | | | | |
|---|---|---|---|---|
| 921,504 | A | * | 5/1909 | Been .................... B61K 1/02 414/265 |
| 1,030,320 | A | * | 6/1912 | Morgan ............... B65G 67/00 254/45 |
| 3,312,359 | A | * | 4/1967 | Glover .................. B65H 5/006 414/389 |
| 4,005,787 | A | | 2/1977 | Sleep .............................. 214/58 |

(Continued)

FOREIGN PATENT DOCUMENTS

| | | | |
|---|---|---|---|
| FR | 2.116.231 | 7/1972 | ............ B65G 65/00 |
| JP | 61-016321 | 5/1986 | |
| JP | 2008-221421 | 9/2008 | |

OTHER PUBLICATIONS

PCT Notification of Transmittal of the International Search Report and the Written Opinion of the International Searching Authority for International Application No. PCT/US2010/051386; 10 pages, Jan. 28, 2011.

(Continued)

*Primary Examiner* — James Keenan
(74) *Attorney, Agent, or Firm* — Baker Botts L.L.P.

(57) ABSTRACT

A system for unloading inventory items includes an inventory holder, an unloading station, and a mobile drive unit. The inventory holder stores inventory items. The unloading station includes a barrier that is operable to prevent inventory items from moving past the barrier as the inventory holder moves past the barrier. The mobile drive unit is operable to move the inventory holder toward the unloading station and to move the inventory holder past the barrier.

18 Claims, 6 Drawing Sheets

(56) References Cited

U.S. PATENT DOCUMENTS

| | | | | |
|---|---|---|---|---|
| 4,049,135 | A | * | 9/1977 | Glassmeyer ......... B65D 88/126 108/55.1 |
| 4,508,484 | A | * | 4/1985 | Heiz .................... B65G 67/02 198/597 |
| 4,662,508 | A | * | 5/1987 | Inoue .................. G01G 19/393 177/25.18 |
| 5,205,417 | A | * | 4/1993 | Herren .................... B03B 9/06 198/346 |
| 5,274,984 | A | | 1/1994 | Fukuda .......................... 53/451 |
| 6,203,262 | B1 | | 3/2001 | Frich et al. .............. 414/331.01 |
| 6,543,983 | B1 | * | 4/2003 | Felder ................. B23Q 7/1442 414/331.07 |
| 6,997,666 | B1 | | 2/2006 | Rodgers et al. ......... 414/331.06 |
| 7,402,018 | B2 | | 7/2008 | Mountz et al. .......... 414/331.06 |
| 2002/0094259 | A1 | * | 7/2002 | Wallace .................... B60P 1/00 414/402 |
| 2003/0002966 | A1 | * | 1/2003 | Porter .................. B65F 1/1468 414/421 |
| 2007/0293978 | A1 | | 12/2007 | Wurman et al. .............. 700/213 |
| 2008/0167884 | A1 | | 7/2008 | Mountz et al. .................. 705/1 |
| 2008/0167933 | A1 | | 7/2008 | Hoffman et al. ................. 705/9 |

OTHER PUBLICATIONS

English Translation of Notice of Reasons for Rejection from Japanese Patent Office, Application No. 2012-536831, 6 pages (Japanese language document and Translation document), Received Oct. 24, 2013.

* cited by examiner

SYSTEM FOR UNLOADING ITEMS

CROSS REFERENCE TO RELATED APPLICATION

This application claims the priority of U.S. Ser. No. 12/609,690 filed Jan. 30, 2009, entitled "SYSTEM AND METHOD FOR UNLOADING ITEMS" and is now U.S. Pat. No. 8,444,369 issued May 21, 2013.

TECHNICAL FIELD OF THE INVENTION

This invention relates in general to inventory systems and, more particularly, to a method and system for efficiently unloading inventory items from an inventory holder.

BACKGROUND OF THE INVENTION

Modern inventory systems, such as those in mail-order warehouses, custom-order manufacturing facilities, and airport luggage systems, face significant challenges in responding to requests for inventory items. In inventory systems tasked with responding to large numbers of diverse orders, slow responses to orders may result in an ever-increasing backlog of inventory requests. As a result, efficient use of time and system resources can be crucial to successful operation and management of an inventory system.

To this end, automation can, in many cases, improve speed of operation and system throughput. However, automating certain tasks in inventory systems can create additional difficulties and inefficiencies. For example, automating the unloading of items from transport equipment can require equipment capable of making precise movements. Such equipment can be expensive and may slow overall operation of the system.

SUMMARY OF THE INVENTION

In accordance with the present invention, the disadvantages and problems associated with inventory systems have been substantially reduced or eliminated. In particular, an inventory system is provided that is capable of unloading inventory items from an inventory holder.

In accordance with one embodiment of the present invention, a method for unloading inventory items includes storing an inventory item on an inventory holder and moving the inventory holder toward an unloading station with a mobile drive unit. Additionally, the method includes moving the inventory holder past a barrier of the unloading station. The method further includes preventing the inventory item from moving past the barrier as the mobile drive unit moves the inventory holder past the barrier.

In accordance with another embodiment of the present invention, a system for unloading inventory items includes an inventory holder, an unloading station, and a mobile drive unit. The inventory holder is capable of storing one or more inventory items. The unloading station includes a barrier that prevents inventory items from moving past it as the inventory holder moves past the barrier. The mobile drive unit is capable of moving the inventory holder toward the unloading station and past the barrier.

Technical advantages of certain embodiments of the present invention include the ability to automate the removal of inventory items from a mobile transport device. Automated removal of inventory items facilitates efficient processing of inventory items within an inventory system by, for instance, placing inventory items on a scale or conveyor quickly and without human intervention. Other technical advantages of certain embodiments of the present invention include reducing maintenance and breakage costs. Certain aspects of the present invention provide the ability to unload inventory items from an inventory holder without a mechanical actuator independently applying force to the inventory items. The lack of a mechanical actuator may reduce the production and maintenance costs associated with the system.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantage, reference is now made to the following description, taken in conjunction with the accompanying drawings, in which.

DETAILED DESCRIPTION OF THE INVENTION

Figure 1A:
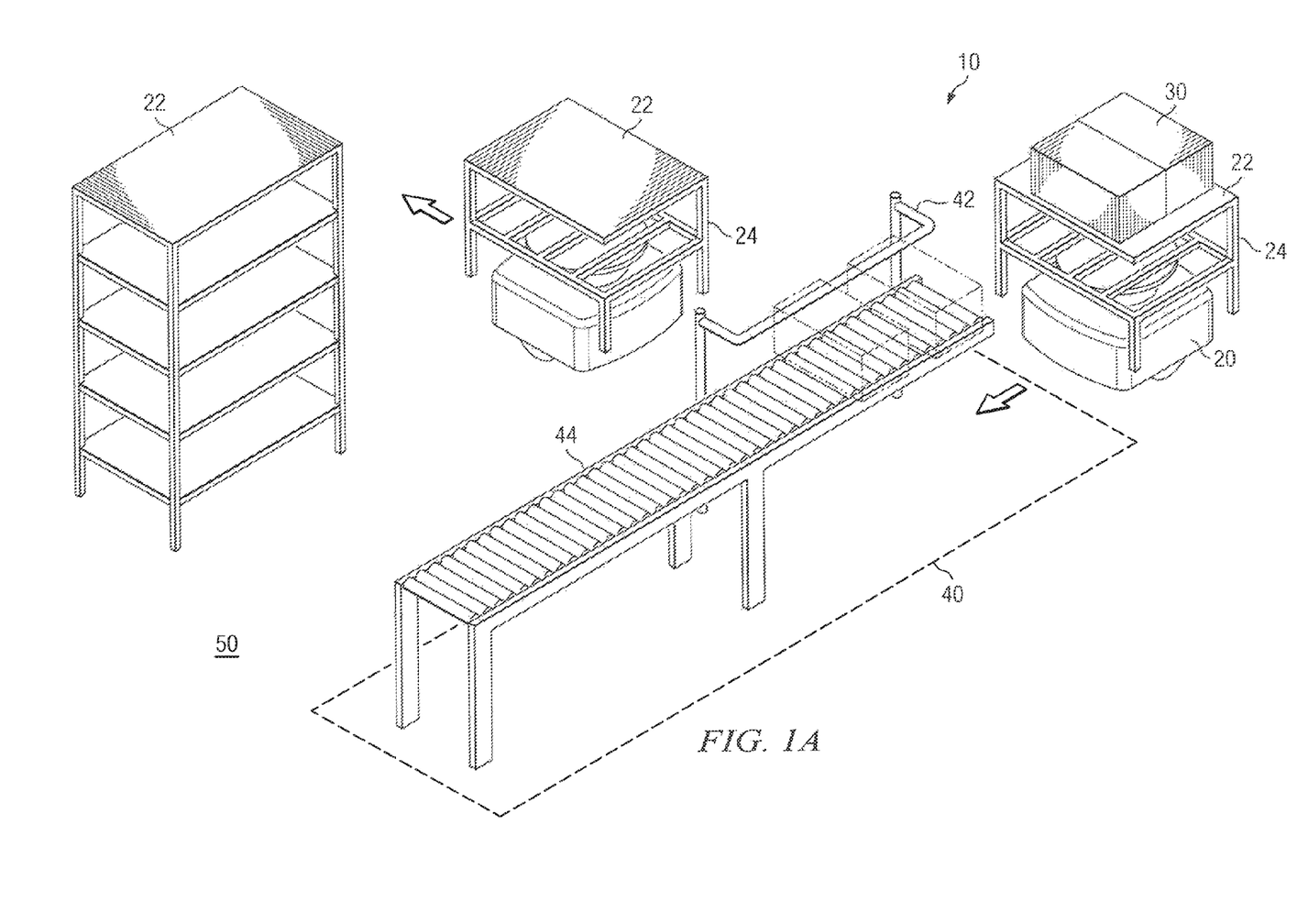
FIGS. 1A and 1B illustrate different views of an inventory system according to particular embodiments of the present invention.
Figure 1B:
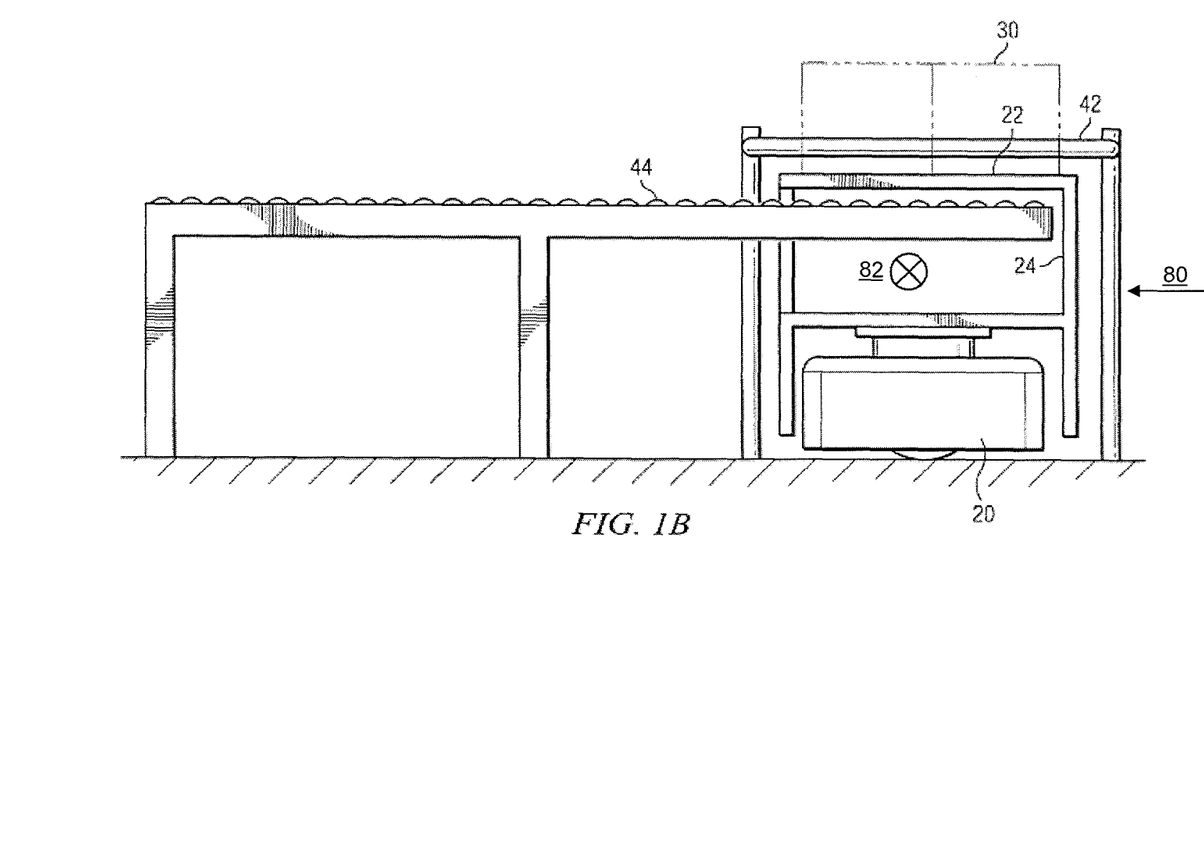

FIGS. 1A and 1B illustrate an inventory system 10 that includes a mobile drive unit 20, an inventory holder 22, inventory items 30, an unloading station 40, and a workspace 50. Additionally, unloading station 40 includes a barrier 42 and a deposit surface 44. Mobile drive unit 20 transports inventory holder 22 between designated points within workspace 50. Specifically, mobile drive unit 20 may move inventory holder 22 to unloading station 40. As mobile drive unit 20 moves inventory holder 22 through unloading station 40, barrier 42 prevents inventory items 30 from moving past barrier 42. As a result, in particular embodiments, barrier 42 causes inventory items 30 to be dislodged or otherwise unloaded from inventory holder 22.

Mobile drive units 20 move inventory holders 30 and supply holders 60 between locations within workspace 70. Mobile drive units 20 may represent any devices or components appropriate for use in inventory system 10 based on the characteristics and configuration of inventory holders 30, supply holders 60 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system 10 configured to move inventory holders 30 and supply holders 60 along tracks, rails, cables, or other guidance elements traversing workspace 70. In such an embodiment, mobile drive units 20 may receive power through a connection to the guidance elements, such as a powered rail. The contents and operation of mobile drive unit 20, according to a particular embodiment, are described in greater detail below with respect to FIG. 2.

Mobile drive unit 20 may autonomously determine its destination and control its movement. Mobile drive unit 20 may additionally or alternatively receive information that identifies destinations for mobile drive unit 20 and/or controls operation of components of mobile drive unit 20 from a management device of inventory system 10, from an operator of inventory system 10, or any other suitable component or party. Mobile drive unit 20 may receive information through a wireless interface, over a wired connection, or using any other suitable components to communicate with an operator or management device of inventory system 10. In general, movement of mobile drive unit 20 may be controlled, in whole or in part, by mobile drive unit 20, or may be controlled entirely by external devices or parties.

For the sake of simplicity, however, the remainder of this description assumes that mobile drive unit 20 wirelessly receives orders, data, instructions, commands, or information structured in any other appropriate form, referred to here as a "command" or "commands," from a remote component of inventory system 10. These commands may identify a particular inventory holder 22 to be moved by mobile drive unit 20 and/or an unloading station 40 to which mobile drive unit 20 is to deliver a particular inventory holder 22. Mobile drive unit 20 then controls operation of motors, wheels, and/or other components of mobile drive unit 20 to move itself and/or inventory holder 22 to appropriate locations.

Inventory holder 22 stores inventory items 30, and may represent any suitable apparatus on or in which inventory items 30 may be laid, hung, stacked, attached to, or otherwise stored. Inventory holder 22 may enclose inventory items 30 partially or entirely while such inventory items 30 are stored in inventory holder 22. In particular embodiments, inventory holder 22 may represent a single surface on which inventory items 30 may rest. Additionally, in particular embodiments, inventory holder 22 may be integrated with mobile drive unit 20 or represent a portion of mobile drive unit 20. In such embodiments, inventory holder 22 may represent a shelf or other surface of mobile drive unit 20 on which inventory items 30 may rest. In alternative embodiments, inventory holder 22 may be a separate element from mobile drive unit 20. In such embodiments, mobile drive unit 20 may, as part of transporting inventory holder 22, move to a particular inventory holder 22 and lift, couple to, or otherwise dock with that inventory holder 22. Mobile drive unit 20 may then move the inventory holder 22 within workspace 50, including toward unloading station 40.

Inventory holder 22 may comprise any appropriate component or components configured to store inventory items 30 in any suitable manner. In particular embodiments, inventory holder 22 may include a first surface (referred to herein as a "storage platform") on which inventory items 30 may be stored and a second surface (referred to herein as a "docking platform") that couples to or rests on mobile drive unit 20 when mobile drive unit 20 is transporting inventory holder 22. In such embodiments, one or more supports 24 may separate the first surface from the second surface and/or may connect the first surface to the second surface. This may allow an element of unloading station 40, such as deposit surface 44, to pass between the surfaces when mobile drive unit 20 moves inventory holder 22 through unloading station 40, as described in greater detail below.

Although FIG. 1 illustrates for purposes of example an inventory holder 22 that includes a single storage platform, particular embodiments of inventory system 10 may utilize an inventory holder 22 that includes a plurality of storage platforms each capable of supporting inventory items 30. For example, in particular embodiments, inventory holder 22 may contain stacked or parallel storage platforms. Each storage platform may be supported by one or more supports 24, allowing sufficient space between each storage platform to enable a deposit surface 44 to pass between. In such embodiments, particular inventory items 30 may be each deposited on a different deposit surface 44.

Supports 24 represent legs, columns, or any other appropriate structures capable of separating surfaces of inventory holder 22. In particular embodiments, supports 24 represent hollow steel shafts welded to the corners of the surfaces of inventory holder 22. Particular embodiments of inventory system 10 may include an inventory holder 22 with supports 24 located at three corners of a storage platform and a docking platform of the inventory holder 22. The absence of a fourth support 24 may enable mobile drive unit 20 to position inventory holder 30 over deposit surface 44 while moving in a first direction and move toward barrier 42 in a second direction. This may allow deposit surface 44 to be positioned in an appropriate location relative to inventory holder 22 so that inventory items 30 dislodged from inventory holder 22 at unloading station 40 fall onto deposit surface 44.

Additionally, particular embodiments of inventory system 10 may include breakaway, spring-loaded, or other forms of detachable supports 24. Such detachable supports 24 can be disconnected, uncoupled, or otherwise separated from one or more surfaces of inventory holder 22 during operation. As a result, in particular embodiments, detachable supports 24 may support a surface of inventory holder 22 but, upon coming into contact with a fixed element, such as deposit surface 24, bend, separate, or otherwise move, thereby detaching from one or more surface of inventory holder 22 and allowing mobile drive unit 20 to continue moving inventory holder 22 past the fixed element. Thus, in particular embodiments, detachable supports 24 may, while in a first position, support a storage platform positioned above a docking platform of inventory holder 22 and, while in a second position, allow objects or structures to pass between the storage and docking platforms. Furthermore, detachable supports 24 may include a spring-loaded hinge, a ball and socket joint, or other mechanisms capable of returning the detachable support 24 to an original position after bending or flexing.

Inventory items 30 represent any items, material, or animate or inanimate objects suitable for storage, retrieval, delivery, sortation, and/or routing in an automated inventory, warehouse, manufacturing, and/or parts-handling system. As one example, inventory items 30 may each represent individual items of merchandise stored in a warehouse. Mobile drive unit 20 may retrieve inventory items 30 associated with a customer order from another area of workspace 50 to be packed for delivery to a customer or other party. Additionally, mobile drive unit 20 may carry inventory items 30 that are unloaded from a delivery truck and ready for storage in an area of workspace 50.

Moreover, in particular embodiments, inventory items 30 may each represent a set of multiple, independent objects grouped on or in a single pallet, box, or other type of container. For example, in a warehouse environment, multiple items of merchandise to be delivered to a particular retail location may be collected and placed on a pallet or in a box destined for the retail location. The relevant container may then be stored or moved within inventory system 10 as appropriate to facilitate delivery of the container to the designated location.

As another example, inventory items 30 may represent luggage stored in a luggage facility of an airport. Mobile drive unit 20 may transport inventory items 30 representing luggage to be delivered, tracked, and/or processed according to particular policies. This may include transporting particular items of luggage to specific locations for appropriate processing such as transporting selected luggage to an explosives screening station, moving items of luggage associated with a flight that has switched gates, transporting luggage from an arrival flight to baggage claim, or storing luggage belonging to passengers who have missed the flight.

Unloading station 40 represents a location designated for the unloading of inventory items 30 from inventory holders 22. Unloading station 40 may also represent or incorporate any appropriate components for unloading, processing, or handling inventory items 30, such as scanners for monitoring the flow of inventory items 30, communication interfaces for communicating with a management device of inventory system 10, and/or any other suitable components. For example, in particular embodiments, unloading station 40 includes photo gates or other types of detectors that monitor the flow of inventory items 30 and, when backed up inventory items 30 are detected at unloading station 40, unloading station 40 instructs mobile drive units 20 not to bring any more inventory items 30 to unloading station 40 until the back up has been addressed.

Unloading station 40 may be controlled, entirely or in part, by human operators or may be fully automated. Moreover, the human or automated operators of unloading station 40 may be capable of performing certain tasks to inventory items 30, such as counting inventory items 30 or transferring inventory items 30 from inventory holder 22 to another storage or conveyance mechanism. In the illustrated embodiment, unloading station 40 includes a barrier 42 and a deposit surface 44.

Barrier 42 represents any obstacle, obstruction, or blockage that prevents movement of inventory items 30 as mobile drive unit 20 moves through unloading station 40. In particular embodiments, barrier 42 unloads inventory items 30 from inventory holder 22 when inventory holder 22 is moved through unloading station 40. Barrier 42 may be positioned in a particular manner relative to other elements of unloading station 40 to facilitate certain operations when inventory holder 22 is moved through unloading station 40. For example, barrier 42 may be positioned above deposit surface 44 so that inventory items 30 unloaded by barrier 42 will fall onto deposit surface 44.

Additionally, in particular embodiments, barrier 42 may comprise entirely passive components such as a fixed arm or rail positioned at a suitable height to allow inventory holder 22 to pass beneath, around, or by barrier 42. In alternative embodiments, barrier 42 may also include active components to allow barrier 42 to be moved or otherwise configured before or during operation. For example, in particular embodiments, barrier 42 may include one or more arms that can be moved in and out of position above deposit surface 44, so that inventory items 30 stored on certain parts of inventory holder 22 (e.g., inventory items 30 on a particular platform of inventory holder 22) or inventory items 30 of a particular type (e.g., inventory items 30 larger than a particular size) are prevented from moving past barrier 42. As a result, in particular embodiments, barrier 42 may be statically or dynamically configured to selectively remove certain inventory items 30 from inventory holder 22.

Deposit surface 44 represents a platform, scale, shelf, or other surface capable of receiving an inventory item 30 from mobile drive unit 20. For example, in particular embodiments, deposit surface 44 may represent a conveyor belt or a portion of a conveyor belt that receives inventory items 30 unloaded from mobile drive unit 20. This conveyor belt may subsequently transport inventory items 30 to another location within inventory system 10. In such embodiments, mobile drive unit 20 may carry inventory items 30 to unloading station 40 where inventory items 30 are unloaded onto the conveyor belt and transported to another area such as a loading dock, packaging area, shipping facility, or storage location. As another example, deposit surface 44 may represent a scale that receives inventory items 40 and generates a weight for inventory items 40. Deposit surface may also represent a tape and dunnage machine, where inventory items 30 are deposited before being packaged for shipment. As yet another example, deposit surface 44 may represent wrapping material (e.g., a sheet of gift-wrapping paper) onto which inventory items 40 can be deposited for subsequent wrapping. The wrapping material may rest upon another surface or be stretched between supports. As still another example, deposit surface 44 may represent a portion of a garbage disposal system, such as a trash receptacle, a trash compactor, or a conveyor for automated trash disposal, and inventory items 30 may represent trash or other items to be discarded. Additionally, deposit surface 44 may represent a surface or element of an inventory control station or a quality control station.

In general, deposit surface 44 represents any appropriate surface suitable to receive inventory items 30 unloaded from inventory holder 22. Additionally, although the embodiment of unloading station 40 illustrated in FIG. 1 includes a single deposit surface 44, particular embodiments may include any appropriate number of deposit surfaces 44. For example, in particular embodiments, inventory system 10 may include multiple deposit surfaces 44 that may be arranged or configured to receive inventory items 30 from different storage platforms on inventory holder 22.

Workspace 50 represents a physical area of inventory system 10 within which mobile drive unit 20 operates. As an example, workspace 50 may represent a work area in a warehouse. As another example, workspace 50 may represent an area within an airport in which luggage is loaded, unloaded, or transported. Depending on the capabilities of a particular embodiment of inventory system 10, workspace 50 may represent a finite, bounded area or an unbounded area in which mobile drive unit 20 is capable of operating.

In operation, mobile drive unit 20 moves inventory holder 22 between locations within workspace 50 to deliver inventory items 30 to unloading station 40. As indicated above, mobile drive unit 20 may determine movement of mobile drive unit 20 autonomously and/or based on commands received by mobile drive unit 20. In a particular embodiment, mobile drive unit 20 receives a command identifying an inventory holder 22 or a location within workspace 50 containing inventory items 30 and a destination location or unloading station 40 to which inventory items 30 are to be delivered. Mobile drive unit 20 moves to the relevant inventory holder 22. In particular embodiments, mobile drive unit 20 may then couple to, lift, or otherwise dock with inventory holder 22.

Once mobile drive unit 20 has moved to the relevant inventory holder 22 and any appropriate docking has occurred, mobile drive unit 20 transports inventory holder 22 to unloading station 40. At unloading station 40, mobile drive unit 20 interacts with barrier 42 to unload inventory items 30 from inventory holder 22. More specifically, barrier 42 inhibits movement of inventory items 30 stored on inventory holder 22 as mobile drive unit 20 moves inventory holder 22 through unloading station 40.

Furthermore, the configuration of inventory holder 22 and unloading station 40 and/or the movement of mobile drive unit 20 may be designed to facilitate additional operations before, while, or after inventory items 30 are unloaded from inventory holder 22. For example, in a particular embodiment, inventory holder 22 may include a storage platform that is positioned above a deposit surface 44 of unloading station 40 and a docking platform that is positioned below deposit surface 44. As a result, in such embodiments, deposit surface 44 may be able to fit between the storage platform and the docking platform of inventory holder 22 as mobile drive unit 20 moves inventory holder 22 through unloading station 40. Additionally, the storage platform of inventory holder 22 may be supported by appropriately positioned supports 24 that enable mobile drive unit 20 to approach deposit surface 44 in one direction and depart deposit surface 44 in another direction without contacting deposit surface 44. As mobile drive unit 20 departs deposit surface 44, barrier 42, positioned above deposit surface 44, prevents inventory items 30 from being carried off with mobile drive unit 20. In such embodiments, inventory holder 22 slides out from under inventory items 30, dislodging inventory items 30 from inventory holder 22 and causing inventory items 30 to be deposited on deposit surface 44.

Furthermore, as discussed above, a storage platform of inventory holder 22 may be supported by one or more detachable supports 24 that are detachably connected to one or both of a storage platform and a docking platform of inventory holder 22. In such an embodiment, one or more detachable supports 24 may contact deposit surface 44 as mobile drive unit 20 passes through unloading station 40. The detachable connections enable detachable supports 24 to bend or flex, allowing deposit surface 44 to pass between the storage platform and the docking platform. Barrier 42 prevents inventory items moving past barrier 42 as mobile drive unit 20 moves inventory holder 22 through unloading station 40, causing inventory items 30 to be dislodged onto deposit surface 44. Furthermore, in embodiments of inventory system 10 in which inventory holder 22 includes multiple storage platforms, each storage platform may be supported by one or more detachable supports 24.

In another embodiment of inventory system 10, storage platform of inventory holder 22 may be cantilevered on a docking platform of inventory holder 22, and supported by two supports 24, so that mobile drive unit 20 may approach and depart unloading station 40 in the same direction of motion. In such an embodiment, barrier 42 blocks inventory items 30 from moving as mobile drive unit 20 passes through unloading station 40, causing inventory items 30 to be unloaded as inventory holder 22 passes barrier 42 and slides out from under inventory items 30. Additionally, inventory holder 22 may include multiple storage platforms, each supported by two supports 24. In general however, inventory holder 22 may contain any appropriate number and configuration of supports 24 the configuration and operation of inventory system 10.

After inventory items 30 are unloaded from inventory holder 22 at unloading station 40, an operator or automated components of unloading station 40 may further process or handle inventory items 30, or otherwise perform operations involving the unloaded inventory items 30. For example, in particular embodiments, a deposit surface 44 of unloading station 40 may represent a portion of a conveyor belt that transports unloaded inventory items 30 to another location, such as a loading dock, shipping station, or storage location within inventory system 10.

FIG. 1B illustrates a magnified view of unloading station 40 during example operation in a particular embodiment of inventory system 10. In the illustrated example, mobile drive unit 20 has moved inventory holder 22 into unloading station 40 so that a docking platform of inventory holder 22 is positioned below a deposit surface 44 of unloading station 40 and a storage platform of inventory holder 22 is positioned above deposit surface 44. Additionally, as illustrated in FIG. 1B, barrier 42 of unloading station 40 is positioned so that barrier 42 prevents movement of inventory items 30 stored on storage platform of inventory holder 22 but allows the storage platform and other portions of inventory holder 22 to pass by barrier 42 unimpeded.

As discussed above, mobile drive unit 20 may, in particular embodiments, approach deposit surface 44 from a first direction and move away from deposit surface 44 in a second direction to facilitate unloading of inventory items 30. For example, as shown in FIG. 1B, mobile drive unit 20 approaches unloading station 40 (and deposit surface 44) from the right side of the illustration as shown by arrow 80 and then moves away from unloading station 40 in a second direction as shown by arrow 82. In particular embodiments, mobile drive unit 20 may accomplish this by approaching unloading station 40 from a first direction, rotating a predetermined number of degrees while inventory holder 22 is positioned under barrier 44, and departing unloading station 40 in a second direction.

Thus, particular embodiments of inventory system 10 may provide an improved system for unloading inventory items 30 stored by an inventory holder 22. This may improve the ability of inventory system 10 to efficiently retrieve, transport, and storage inventory items 30. In particular embodiments, inventory system 10 may fully automate the unloading of inventory items 30 from a mobile drive unit 20 and thereby improve system efficiency. Additionally, particular embodiments of inventory system 10 may include an unloading station 40 that utilizes passive components or only simple active components. As a result, inventory system 10 may also provide reduced maintenance and breakage costs. Furthermore, by providing the ability to unload inventory items 30 stored on more than one storage platform of inventory holder 22, inventory system 10 can provide increased throughput in processing inventory items 30. Consequently, particular embodiments of inventory system 10 may provide significant operational benefits. Specific embodiments, however, may provide, some, none, or all of these benefits and may provide other benefits as well.

FIGS. 2-5 illustrate a front and side view of particular embodiments of inventory holder 22 while being transported by mobile drive unit 20. As shown in FIGS. 2-5, inventory holder 22 may include a docking platform capable of docking with mobile drive unit 20 and one or more storage platforms on which inventory items 30 may be stored. As further described below, the one or more storage platforms may be supported by a plurality of supports 24.

Figure 2:
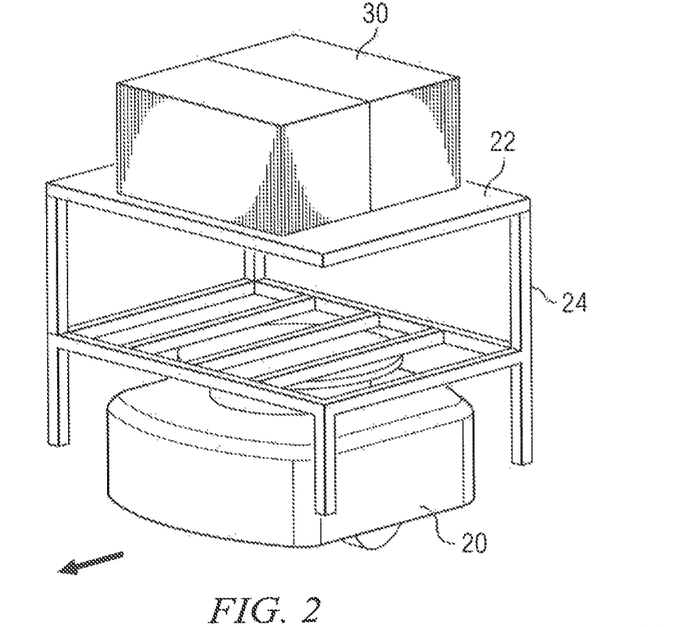
FIGS. 2-5 illustrate in more detail example embodiments of an inventory holder and mobile drive unit that may be utilized in particular embodiments of the inventory system shown in FIGS. 1A and 1B.

FIG. 2 illustrates a particular embodiment of inventory holder 22 in having a storage platform supported by three supports 24. As shown in FIG. 2, the three supports 24 may enable mobile drive unit 20 to approach a deposit surface 44 from a first direction, rotate in place a predetermined number of degrees, and depart deposit surface 44 in a second direction. Thus, the absence of a fourth support 24 may enable mobile drive unit 20 to position inventory holder 30 over deposit surface 44, depart deposit surface 44 without contacting it, and use barrier 42 to unload inventory items 30 on deposit surface 44.

Figure 3:
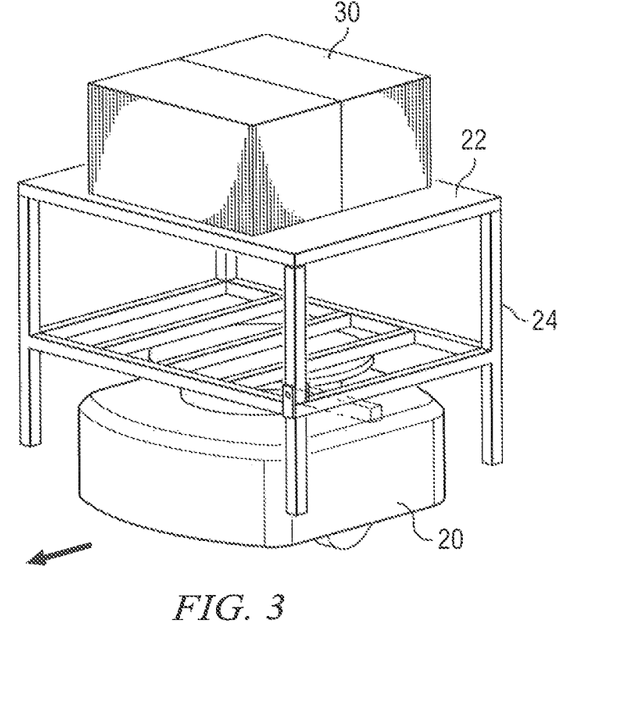

FIG. 3 illustrates another example of a mobile drive unit 20 that supports inventory holder 22 with at least one detachable support 24. As noted above, in particular embodiments, detachable support 24 may be attached to a storage platform or docking platform of inventory holder 22 by a flexible attachment that allows detachable support 24 to bend, rotate, or otherwise move and separate from one or both of the storage platform and the docking platform. Additionally, detachable support 24 may include a spring-loaded hinge, a ball and socket joint, or another mechanism capable of returning detachable support 24 to an original position after bending, rotating, or moving. Detachable support 24 may support the storage platform while mobile drive unit 20 moves inventory holder 22 to unloading station 40 and, when coming into contact with a fixed structure, such as deposit surface 44, bend to allow mobile drive unit 20 to continue moving past the structure. Thus, in such embodiments, mobile drive unit 20 may be able to position inventory holder 22 over deposit surface 44, rotate a predetermined number of degrees, and then move away from deposit surface 44. As mobile drive unit 20 departs deposit surface 44, detachable support 24 contacts deposit surface 44 and bends, rotates, or moves to allow inventory holder 22 to move past deposit surface unimpeded.

Figure 4:
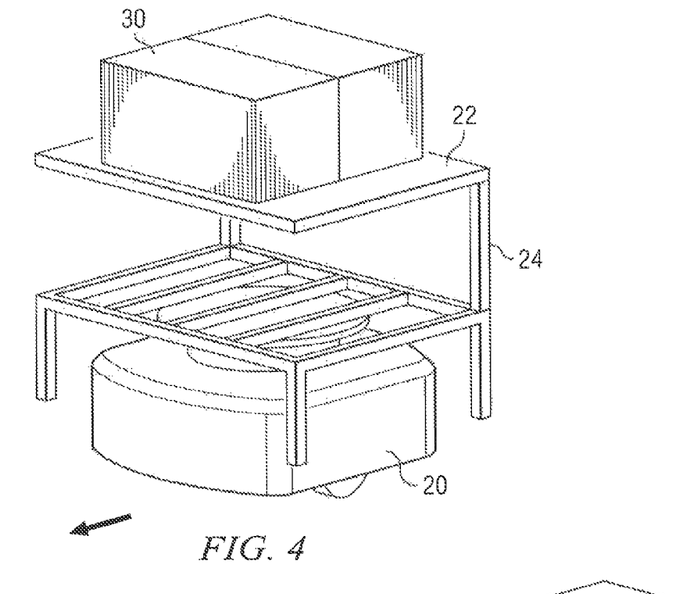

FIG. 4 illustrates another embodiment of inventory holder 22 that includes a cantilevered storage platform supported by two supports 24. In particular embodiments of inventory system 10 that utilize the inventory holder 22 shown in FIG. 4, mobile drive unit 20 may approach and depart a deposit surface 44 of unloading station 40 in the same direction. In such embodiments, a portion of deposit surface 44 can pass between the storage platform and the docking platform. The absence of two support supports 24 enables mobile drive unit 20 to move pass deposit surface 44 without contacting it and without changing its direction. Barrier 42 prevents inventory items 30 stored on the storage platform of inventory holder 22 from moving past barrier 42 and, as a result, such inventory items 30 are unloaded from inventory holder 22.

Figure 5:
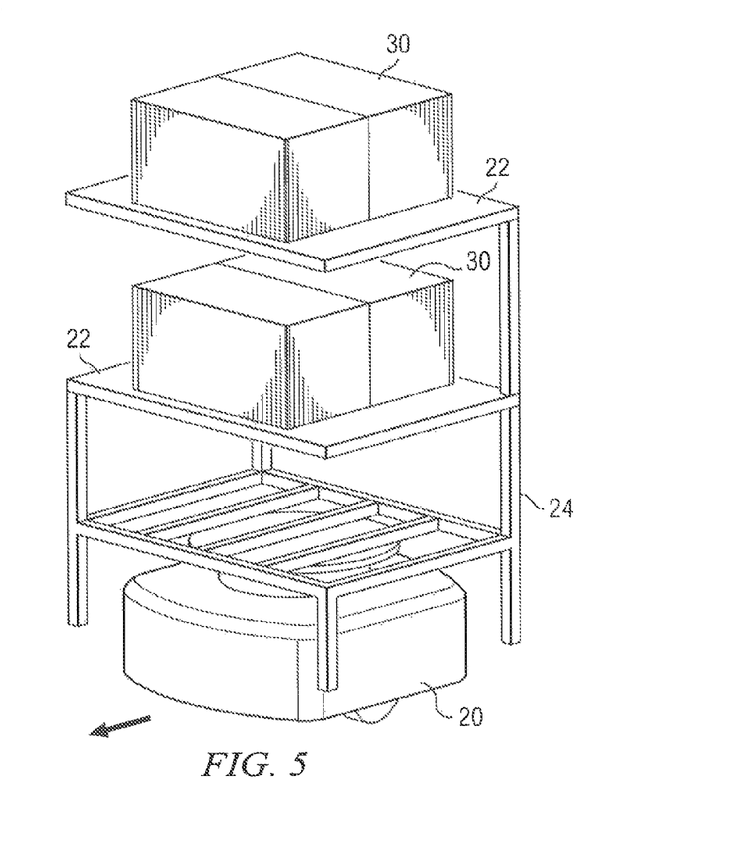

FIG. 5 illustrates an embodiment of inventory holder 22 that includes two storage platforms, each supported by three support supports 24. In particular embodiments of inventory system 10, inventory holder 22 may support multiple storage platforms, as shown in FIG. 5. Such an arrangement enables mobile drive unit 20 to align inventory holder 22 so that a first barrier 42 unloads inventory items 30 from a first storage platform and a second barrier 42 unloads inventory items 30 from a second storage platform. Additionally, unloading station 40 may be configured so that, as inventory holder 22 moves through unloading station 40, the first storage platform is positioned over a lower deposit surface 44 and the second storage platform is positioned over an upper deposit surface 44. As a result, when mobile drive unit 20 moves inventory holder 22 past deposit surfaces 44 and 44, first barrier 42 dislodges inventory items 30 resting on the first storage platform onto lower deposit surface 44 and second barrier 42 dislodges inventory items 30 resting on the second storage platform onto upper deposit surface 44. Inventory items 30 from the first storage platform are thus unloaded onto the lower deposit surface 44, while inventory items 30 from the second storage platform are unloaded onto the upper deposit surface 44. Additionally, unloading station 40 may be laid out so that mobile drive unit 20 deposits inventory items 30 onto a first deposit surface 44 and then moves to and deposits inventory items 30 onto a second deposit surface 44. As a result, the inclusion of multiple storage platforms on inventory holder 22 may increase throughput in inventory system 10.

Figure 6:
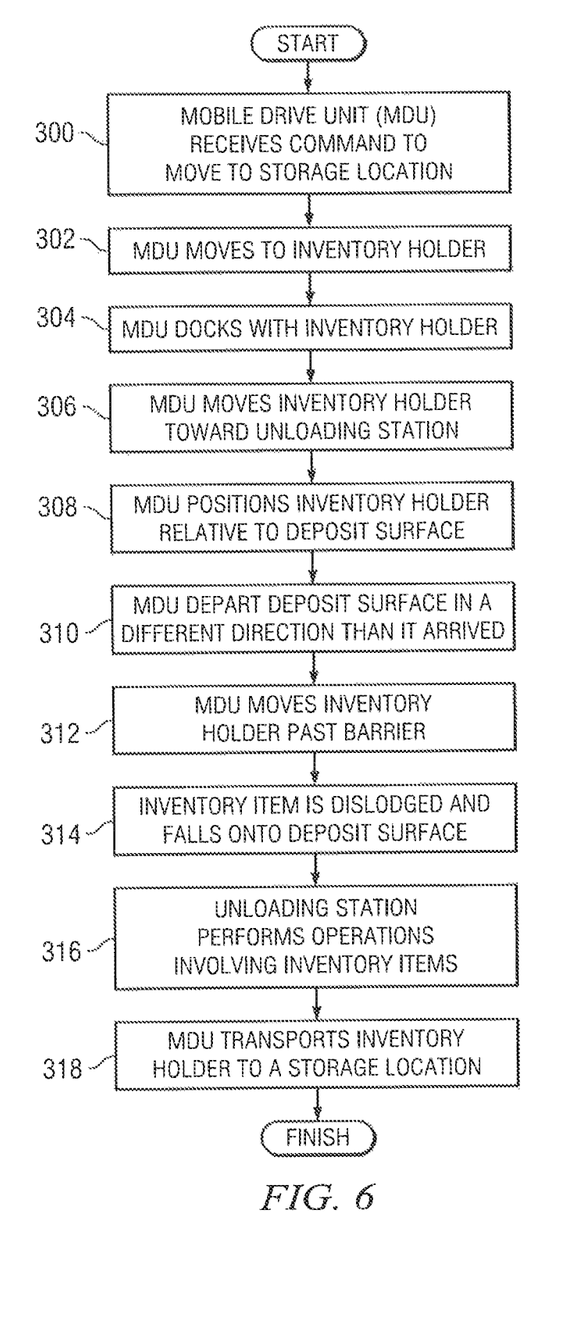
FIG. 6 is a flowchart illustrating example operation of particular embodiments of the inventory system.

FIG. 6 is a flowchart illustrating an example operation of a particular embodiment of inventory station 10, in which inventory items 30 are unloaded from inventory holder 22 onto a deposit surface 44. Operation, in the following example, begins at step 300 with mobile drive unit 20 receiving a command that instructs mobile drive unit 20 to move to a storage location where a particular inventory holder 22 is being stored. As noted above, the command may identify a particular inventory holder 22 to be moved by mobile drive unit 20, an area within workspace 50 where a particular inventory holder 22 is being stored, or other appropriate information to allow mobile drive unit 20 to determine a location from which it can retrieve the relevant inventory holder 22. The command may also identify an unloading station 40, a destination location for inventory items 30 stored in inventory holder 22, or other appropriate information to allow mobile drive unit 20 to determine an unloading station 40 to which mobile drive unit 20 should move the relevant inventory holder 22.

At step 302, mobile drive unit 20 moves to inventory holder 22. In particular embodiments, mobile drive unit 20 may dock with inventory holder 22 before transporting inventory holder 22, as shown at step 304. Once any appropriate docking has occurred, mobile drive unit 20 moves inventory holder 22 toward unloading station 40 at step 306.

In step 308, mobile drive unit 20 may position inventory holder 22 to enable inventory items 30 to be deposited onto deposit surface 44. In general, inventory holders 22 may be positioned relative to a deposit surface 44 in any appropriate manner suitable to allow inventory items 30 to be unloaded from inventory holder 22 onto the relevant deposit surface 44. In particular embodiments, mobile drive unit 20 may position inventory holder 22 such that a storage platform of inventory holder 22 is above deposit surface 44 and a docking platform of inventory holder 22 is below deposit surface 44.

At step 310, mobile drive unit 20 may, in particular embodiments, rotate a predetermined number of degrees to allow mobile drive unit 20 to depart deposit surface 44 in a different direction than the one in which it arrived. In alternative embodiments of inventory system 10, mobile drive unit 20 may be configured to arrive and depart deposit surface 44 in the same direction or to change direction without rotating. Mobile drive unit 20 then begins moving away from deposit surface 44. In moving away from deposit surface 44, mobile drive unit 20 moves inventory holder 22 past barrier 42 at step 312. As mobile drive unit 20 moves inventory item 30 carried on inventory holder 22 contacts barrier 42, which prevents inventory item 30 from moving forward with mobile drive unit 20. As a result, barrier 42 unloads inventory item 30 from inventory holder 22. In the described embodiment, the unloaded inventory item 30 is dislodged from inventory holder 22 and falls onto deposit surface 44 in step 314. As noted above, particular embodiments of inventory system 10 may include a mobile drive unit 20 which supports a plurality of inventory holders 22. In such embodiments, multiple barriers 50 may each block a particular inventory item 30 resting on a different inventory holder 22.

Additionally, in particular embodiments, one or more barriers 42 of unloading station 40 may dynamically configurable. As a result, in particular embodiments, an operator or automated components of unloading station 40 may configure the relevant barriers 42 to selectively prevent inventory items 30 from passing. For example, in particular embodiments, one or more barriers 42 may be moved into the path of inventory holder 22 as inventory holder 22 is moved through unloading station 40. This may allow unloading station 40 to selectively remove inventory items 30 from inventory holder 22. Thus, in particular embodiments, one or more barriers 42 of unloading station 40 may be positioned, activated, or otherwise configured prior to step 314.

After inventory items 30 are deposited onto deposit surface 44, unloading station 40 may process or handle inventory items 30, or perform operations involving inventory items 30 in step 316. In particular embodiments, deposit surface 44 may receive inventory items 30 from inventory holder 22 and transport or otherwise convey inventory items 30 to another area within inventory system 10.

Mobile drive unit 20 may then continue moving inventory holder 22 away from unloading station 40. Depending on the circumstances, mobile drive unit 20 may be instructed to return inventory holder 22 to its original storage location or a new storage location identified to mobile drive unit 20, as shown at step 318. The operation of inventory system 10 with respect to unloading inventory items 30 from inventory holder 22 may then terminate as shown in FIG. 6.

Although FIG. 6 illustrate steps executed in particular embodiments inventory system 10 in a particular order, alternative embodiments inventory system 10 may perform all, some, or none of these steps and may do so in any appropriate order. Moreover, any two or more of the steps illustrated in any of FIG. 6 may be combined, modified or deleted where appropriate and additional steps may also be added.

FIGS. 7A-7D show an overhead view of a particular embodiment of unloading station 40 as inventory items 30 are unloaded from inventory holder 22. In the illustrated embodiment, a first mobile drive unit 20 (not shown) moves a first inventory holder 22a into unloading station 40 and a second mobile drive unit 20 (not shown) moves a second inventory holder 22b into unloading station 40.

Figure 7A:
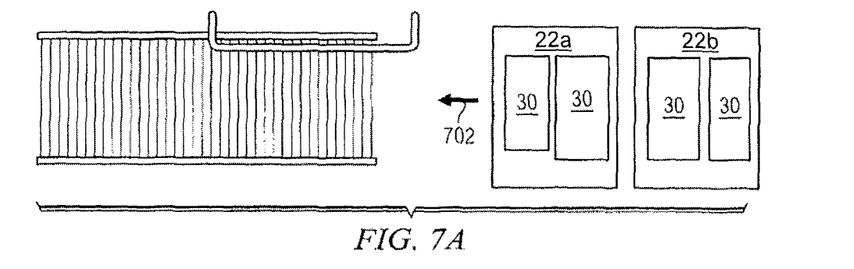
FIGS. 7A-7D show an overhead view of an unloading station during operation of a particular embodiment of the inventory system.
Figure 7B:
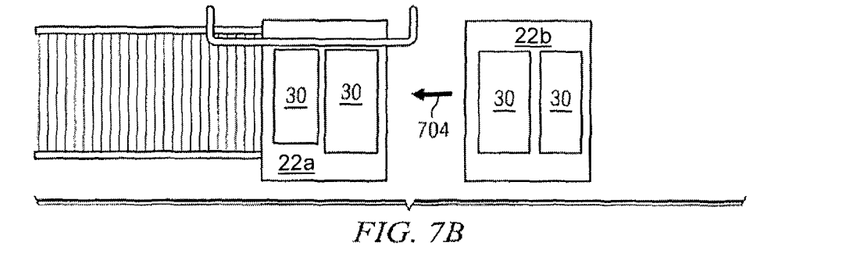

As indicated by arrow 702 in FIG. 7A, the first mobile drive unit 20 moves inventory holder 22a in a first direction toward deposit surface 44. The first mobile drive unit 20 may position inventory holder 22a over deposit surface 44 as shown in FIG. 7B. Meanwhile, the second mobile drive unit 20 may move inventory holder 22b toward unloading station 40 as shown by arrow 704.

Figure 7C:
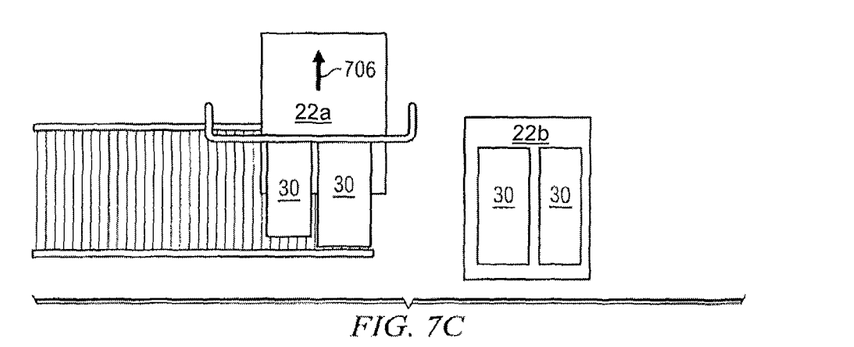

After positioning inventory holder 22a in an appropriate over deposit surface 44, the first mobile drive unit 20 moves inventory holder 22a away from unloading station 40 in a second direction, as indicated by arrow 706 in FIG. 7C. In doing so, the first mobile drive unit 20 moves inventory holder 22a under barrier 42. Barrier 42 prevents inventory items 30 stored on inventory holder 22a from moving past barrier 42. This may dislodge or otherwise unload inventory items 30 from inventory holder 22a onto deposit surface 44, as shown.

Figure 7D:
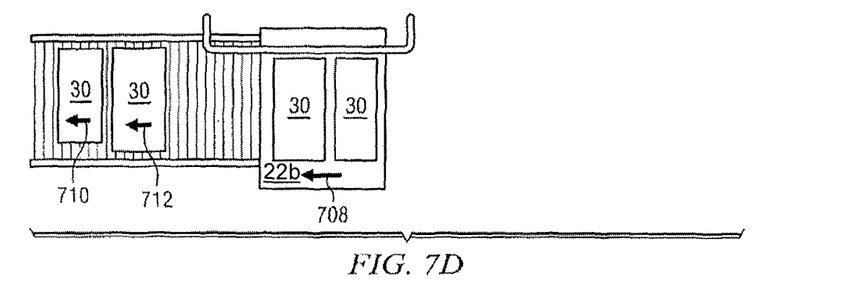

Once mobile drive unit 20 has moved away from deposit surface 44, the second mobile drive unit 20 may position inventory holder 22b over deposit surface 44, as indicated by arrow 708 in FIG. 7D. Meanwhile, in the illustrated embodiment, deposit surface 44 represents a portion of a conveyor belt that transports inventory items 30 unloaded from inventory holder 22a to another location in inventory system 10 as shown by arrows 710 and 712. Thus, as illustrated by FIGS. 7A-7D, particular embodiments of inventory system 10 can quickly unload inventory items 30 from multiple inventory holders 22 using only the motion of mobile drive units 20 as mobile drive units 20 move into, through, or away from unloading station 40.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for unloading inventory items, comprising:
   an inventory holder operable to store an inventory item;
   an unloading station comprising a barrier, the barrier operable to prevent inventory items from moving past the barrier as the inventory holder moves past the barrier; and
   a mobile drive unit operable to:
      move the inventory holder in a first direction toward the unloading station until a center of gravity of the mobile drive unit passes beneath at least a portion of a deposit surface; and
      change movement from the first direction to movement in a second direction such that the mobile drive unit moves the inventory holder past the barrier through an opening formed by at least two vertical portions of the barrier; and
   wherein the barrier is operable to prevent inventory items from moving past the barrier by dislodging inventory items from the inventory holder as the mobile drive unit moves the inventory holder past the barrier; and
   wherein the deposit surface is operable to receive inventory items dislodged from the inventory holder by the barrier.

2. The system of claim 1, wherein the deposit surface is located below the barrier.

3. The system of claim 2, wherein the deposit surface comprises at least a portion of a conveyor belt.

4. The system of claim 2, wherein the deposit surface comprises wrapping paper.

5. The system of claim 2, wherein the deposit surface comprises a trash receptacle.

6. The system of claim 2, wherein the deposit surface comprises a scale.

7. The system of claim 1, wherein:
   the inventory holder is operable to store an inventory item by storing a plurality of inventory items of a plurality of item types on an inventory holder; and
   the barrier is operable to prevent the inventory item from moving past the barrier by preventing one or more inventory items of a first item type from moving past the barrier and allowing one or more inventory items of a second item type to move past the barrier.

8. The system of claim 1, wherein the inventory holder comprises:
   a first platform operable to store the inventory item;
   a second platform operable to couple to the mobile drive unit; and
   one or more supports coupling the first platform to the second platform.

9. A system for unloading inventory items, comprising:
an inventory holder operable to store an inventory item;
an unloading station comprising a barrier, the barrier operable to prevent inventory items from moving past the barrier as the inventory holder moves past the barrier; and
a mobile drive unit operable to:
  move the inventory holder in a first direction toward the unloading station until a center of gravity of the mobile drive unit passes beneath at least a portion of a deposit surface; and
  change movement from the first direction to movement in a second direction such that the mobile drive unit moves the inventory holder past the barrier through an opening formed by at least two vertical portions of the barrier;
wherein the inventory holder comprises:
  a first platform operable to store the inventory item;
  a second platform operable to couple to the mobile drive unit; and
  one or more supports coupling the first platform to the second platform; and
wherein the deposit surface is operable to receive items dislodged from the inventory holder by the barrier, and wherein at least a portion of the deposit surface passes between the first platform and the second platform of the inventory holder as the mobile drive unit moves the inventory holder past the barrier.

10. A system for unloading inventory items, comprising:
an inventory holder operable to store an inventory item;
an unloading station comprising a barrier operable to prevent inventory items from moving past the barrier as the inventory holder moves past the barrier; and
a mobile drive unit operable to move the inventory holder toward the unloading station and to move the inventory holder past the barrier;
wherein:
  the inventory holder comprises:
    a first platform operable to store the inventory item;
    a second platform operable to couple to the mobile drive unit; and
    one or more supports coupling the first platform to the second platform;
  the unloading station further comprises a deposit surface operable to receive items dislodged from the inventory holder by the barrier,
  at least a portion of the deposit surface passes between the first platform and the second platform as the mobile drive unit moves the inventory holder past the barrier;
  the one or more supports comprise at least one detachable support; and
  the deposit surface detaches the detachable support from one of the first platform and the second platform while the portion of the deposit surface passes between the first platform and the second platform.

11. The system of claim 10, wherein the detachable support is operable to return to an original position after the detachable support moves past the portion of the deposit surface.

12. The system of claim 10, wherein the mobile drive unit is operable to move the inventory holder toward the unloading station by:
  moving the mobile drive unit to the inventory holder;
  docking the mobile drive unit with the inventory holder; and
  moving the mobile drive unit to the unloading station after the mobile drive unit docks with the inventory holder.

13. A non-transitory computer-readable medium comprising logic, the logic, when executed by a processor, operable to:
  instruct a mobile drive unit to move to an inventory holder storing an inventory item; and
  instruct the mobile drive unit to:
    move the inventory holder in a first direction toward an unloading station, such that a center of gravity of the mobile drive unit passes beneath at least a portion of a deposit surface; and
    change movement from the first direction to movement in a second direction such that the mobile drive unit moves the inventory holder past a barrier associated with the unloading station through an opening formed by at least two vertical portions of the barrier, wherein the barrier is operable to prevent the inventory item from moving past the barrier as the inventory holder moves past the barrier; and
  wherein the barrier is operable to prevent inventory items from moving past the barrier by dislodging inventory items from the inventory holder as the mobile drive unit moves the inventory holder past the barrier; and wherein the deposit surface is operable to receive inventory items dislodged from the inventory holder by the barrier.

14. The non-transitory computer-readable medium of claim 13, the logic, when executed by a processor, operable to cause the barrier to prevent the inventory item from moving past the barrier by preventing one or more inventory items of a first item type from moving past the barrier and allowing one or more inventory items of a second item type to move past the barrier.

15. The non-transitory computer-readable medium of claim 13, wherein the inventory holder comprises:
  a first platform operable to store the inventory item;
  a second platform operable to couple to the mobile drive unit; and
  one or more supports coupling the first platform to the second platform.

16. A method for unloading inventory items, comprising steps of:
  moving, by a mobile drive unit, an inventory holder storing an inventory item in a first direction toward an unloading station, such that a center of gravity of the mobile drive unit passes beneath at least a portion of a deposit surface;
  changing, by the mobile drive unit, movement from the first direction to movement in a second direction such that the mobile drive unit moves the inventory holder past a barrier of the unloading station through an opening formed by at least two vertical portions of the barrier;
  preventing the inventory item from moving past the barrier as the inventory holder is moved past the barrier by the mobile drive unit; and
wherein:
  the barrier is operable to prevent the inventory item from moving past the barrier by dislodging the inventory item from the inventory holder as the mobile drive unit moves the inventory holder past the barrier; and
  the deposit surface is operable to receive the inventory item dislodged from the inventory holder by the barrier.

17. The method of claim 16, further comprising:
    docking the mobile drive unit with the inventory holder; and
    moving, by the mobile drive unit, the inventory holder to the unloading station after the mobile drive unit docks with the inventory holder.

18. The method of claim 16, wherein the deposit surface is located below at least a portion of the barrier.

\* \* \* \* \*